United States Patent [19]

Hoshi et al.

[11] Patent Number: 4,736,358
[45] Date of Patent: Apr. 5, 1988

[54] RECORDING MEDIUM CLAMPING APPARATUS

[75] Inventors: Akio Hoshi; Yuji Yokota; Haruhiko Okumura, all of Chichibu, Japan

[73] Assignee: Canon Denshi Kabushiki Kaisha, Chichibu, Japan

[21] Appl. No.: 887,612

[22] Filed: Jul. 21, 1986

[30] Foreign Application Priority Data

Jul. 22, 1985 [JP] Japan .................. 60-162374
Sep. 14, 1985 [JP] Japan .................. 60-203993

[51] Int. Cl.$^4$ .................. G11B 17/04; G11B 3/62
[52] U.S. Cl. .................. 369/270; 360/99; 369/77.2
[58] Field of Search .................. 369/270, 271, 77.1, 369/75.2, 77.2; 360/99

[56] References Cited

U.S. PATENT DOCUMENTS

| 4,208,682 | 6/1980 | Bryer .................. 360/99 |
| 4,539,613 | 9/1985 | Suyama et al. . |
| 4,583,141 | 4/1986 | Shimaoka .................. 360/99 |
| 4,592,040 | 5/1986 | Ohsaki .................. 369/77.1 |
| 4,614,988 | 9/1986 | Mahnke .................. 369/77.1 |
| 4,641,212 | 2/1987 | Yokota et al. . |
| 4,641,297 | 2/1987 | Watanabe .................. 369/75.2 |

FOREIGN PATENT DOCUMENTS 2809060 9/1979 Fed. Rep. of Germany .

Primary Examiner—Steven L. Stephan
Attorney, Agent, or Firm—Spencer & Frank

[57] ABSTRACT

A clamp operating member which is bendable cooperates with a spindle to support a clamping member which cooperates to clamp a disc-shaped recording medium and to position the clamping member in a clamped position and an unclamped position. The arrangement has a restraining member engaging with the clamp operating member to bend the clamp operating member when the clamp operating member is in a position to position the clamping member in an unclamped position. The clamp operating member is bent by the restraining member when in the unclamped condition to reduce an operating space occupied by the clamp operating member.

19 Claims, 7 Drawing Sheets

RECORDING MEDIUM CLAMPING APPARATUS

BACKGROUND OF THE INVENTION

1. Field of the Invention

The present invention relates to a recording medium clamping apparatus, and more particularly to a clamping apparatus used in an apparatus for recording and/or reproducing on a disc-shaped recording medium such as a magnetic disc for clamping a recording medium on a rotating spindle.

2. Description of the Prior Art

As an example of a conventional type of clamping apparatus is known an arrangement such as shown in FIGS. 1A and 1B.

In FIGS. 1A and 1B, reference numeral 1 denotes a base of a magnetic disc recording and/or reproducing apparatus. Reference numeral 2 denotes a spindle for driving rotatingly a magnetic disc 10 which is a recording medium. Reference numeral 3 denotes an upper plate member as an insertion guide for guiding a jacket 10' that accommodates a magnetic disc 10 on the base 1. Reference numeral 4 denotes a center cone as a clamping means to position the center portion of the magnetic disc 10 on the spindle 2 and clamp the magnetic disc 10 with the spindle. Reference numeral 5 denotes a clamp operating plate which supports rotatably the center cone 4 near its top end 5a. Reference numeral 6 denotes a cam which is in contact with the plate 5 near its base portion 5b so as to cause the plate to swing. Reference numeral 7 denotes a shaft linking an operating lever (not shown) to the cam 6. Reference numeral 8 denotes a leaf spring supporting the plate 5 at its base portion and exerting a return force pushing the plate upwards. Reference numeral 9 denotes an attaching screw for fixing the leaf spring 8 to the base 1.

FIGS. 1A and 1B show the condition when the magnetic disk 10 is not clamped and the condition when the magnetic disc 10 is clamped, respectively.

In the unclamped condition shown in FIG. 1A, when the operating lever (not shown) rotates the cam 6 in the direction of an arrow A, the plate 5 is pushed downwards, so that the center cone 4 which is supported by the plate 5 traces an arc and moves into the center opening of the magnetic disc 10 and into a recess 2a on the spindle 2. Then, the magnetic disc 10 is positioned and clamped. When the cam 6 has rotated through approximately 90 degrees, the clamping action is completed, thereby producing the condition shown in FIG. 1B.

In conventional clamping apparatus, however, the plate 5 is supported at one end by a leaf spring 8 and is arranged so as to move through an arc, so that when the magnetic disc 10 is not clamped, that is, in the condition shown in FIG. 1A, the end 5a is in an extremely high position. This influences the overall thickness of the recording and/or reproducing apparatus, and prevents a slim design of such an apparatus.

SUMMARY OF THE INVENTION

It is, therefore, an object of the present invention to provide a recording medium clamping apparatus which will allow a slim design of a recording and/or reproducing apparatus.

It is a further object of the present invention to provide a recording medium clamping apparatus which clamp a recording medium with stability and accurately.

In the first aspect of the present invention, a recording medium clamping apparatus comprises:

a clamping member cooperating with a spindle to clamp a disc-shaped recording medium in its center portion;

a bendable clamp operating member for supporting the clamping member rotatably;

a supporting member for supporting swingably the clamp operating member between a first position at which the clamping member performs clamping and a second position other than the first position; and a restraining member engaging with the clamp operating member in the vicinity of the second position to bend the clamp operating member in a condition that the restraining member engages with the clamp operating member.

Here, the clamp operating member may have a first plate for supporting the clamping member rotatably, a second plate engaging with the first plate to support the first plate swingably in a direction of the spindle from a third position and being swingable between the first and the second positions and an energizing member for energizing the first plate towards the third position. The restraining member may engage with the first plate when the second plate is in the vicinity of the second position to move the first plate from the third position against an energizing force applied by the energizing member.

Here, the energizing member may have a spring disposed at a joint portion between the first and the second plates. The supporting member may have a leaf spring mounted on a base of the apparatus. The second plate may be supported swingably by the leaf spring.

In the second aspect of the present invention, a recording medium clamping apparatus comprises:

a clamping member cooperating with a spindle to clamp a disc-shaped recording medium in its center portion;

a bendable clamp operating member for supporting the clamping member rotatably;

a supporting member for supporting swingably the clamp operating member between a first position at which the clamping member performs clamping and a second position at a distance from the first position;

a restraining member engaging with the clamp operating member in the vicinity of the second position to bend the clamp operating member in a condition that the restraining member engages with the clamping operating member; and a pressing member for pressing the clamp operating member toward the spindle in the vicinity of a portion to which the clamping member is attached when the clamping member clamps the recording medium.

Here, the recording medium clamping apparatus may further comprise a command member for moving the clamp operating member toward the first position. The pressing member may be movable toward a portion which is in the vicinity of the portion to which the clamping member is attached in relation to an operation of the command member to press the clamping operating member.

The clamp operating member may have a first plate for supporting the clamping member rotatably, a second plate engaging with the first plate support the first plate swingably in a direction of the spindle from a third position and being swingable between the first and the second positions and an energizing member for energizing the first plate towards the third position, and the restraining member engages with the first plate when the second plate may be in the vicinity of the second position to move the first plate from the third position against an energizing force applied by the energizing member.

The pressing member may have a first roller member. The first plate may have a receiving member receiving a pressing force for pressing against the first plate when the first roller member rides over the receiving member.

The command member may have a second roller member which moves simultaneously with the first roller member to move the second plate towards the first position, the second plate may have a protruding member over which the second roller member rides to move the second plate, and the command member may further have a member which is coupled to the first and the second roller members and which is movable in the direction in which the first and the second roller members ride over the receiving member and the protruding member, respectively.

Here, the distance between the first and the second roller members may be smaller than a distance between a position at which the first roller member rides over the receiving member and a position at which the second roller member rides over the protruding member, so that after the second plate have reached the first position by a movement of the second roller member, the first roller member engages with the receiving member to press the first roller member against the first plate.

In a third aspect of the present invention, a recording medium clamping apparatus comprises:
 a driving member having a rotating shaft for rotating a disc-shaped recording medium;
 a pushing member for pushing the recording medium against the rotating shaft; and
 a supporting means for supporting the pushing member, the supporting member having
  a first supporting member for supporting the pushing member rotatably, and
  a second supporting member swingably supported on a base of the recording medium clamping apparatus and for supporting the first supporting member swingably.

The second supporting member may be swingable between a first position at which the recording member is pushed against the rotating shaft by the first supporting member and the pushing member and a second position other than the first position.

The recording medium clamping apparatus may further comprise a restraining member engaging with the first supporting member in the vicinity of the second position to swing the first supporting member against the second supporting member in a condition that the restraining member may engage with the first supporting member.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figure 1A:
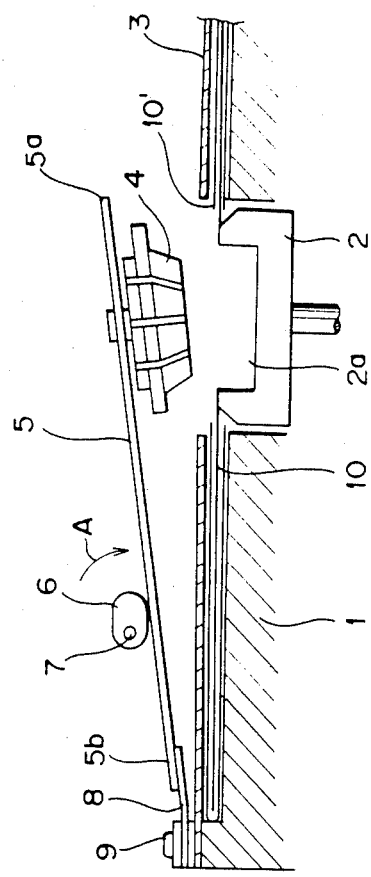
FIGS. 1A and 1B are side views showing a condition in which a recording medium is not clamped and a condition in which a recording medium is clamped, respectively, in an example of a conventional recording medium clamping apparatus.

FIGS. 2A–2C and FIG. 3 show an embodiment of a recording medium clamping apparatus according to the present invention.

In FIGS. 2A–2C and FIG. 3, the elements having the same reference numerals as in FIGS. 1A and 1B have substantially the same arrangement and the same effect, and so no explanation will be made of these elements to the extent that such omission does not hinder an understanding of the present invention.

Figure 3:
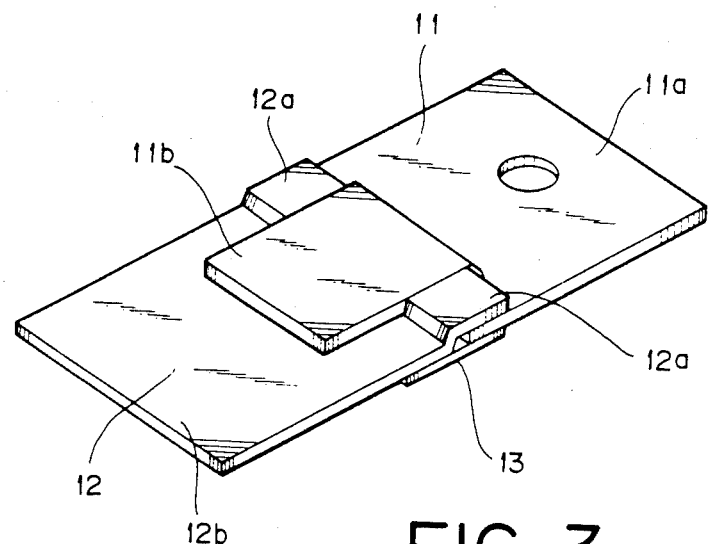
FIG. 3 is a perspective view showing a coupled condition of a first and a second plate in FIGS. 2A, 2B and 2C.

A clamp operating member corresponding to the clamp operating plate 5 in the prior art is divided in the present embodiment into a two-part structure comprising a first and a second plate denoted by reference numerals 11 and 12. These plates 11 and 12 have step-shaped arm portions 11b and 12a at their respective rear and front end portions. As shown in FIG. 3, these arm portions 11b and 12a are arranged alternately. Both arm portions are coupled by a pivot restriction member, in this case an elastic energizing member which may be a hinge spring 13, at this joint portion. The first plate 11 can bend at this joint portion in a downward direction with respect to the second plate 12. The hinge spring 13 is formed into a leaf spring so that in a natural condition the arm portion 11b of the first plate 11 and the arm portion 12a of the second plate 12 make contact with the upper surfaces of the second and first plates 12 and 11, respectively, and appear as a straight line when viewed from the side. That is, the first plate 11 is at a third position as a result of the restrictions of the arm portions 11b and 12a. Furthermore, the hinge spring 13 is fixed to the first and second plates 11 and 12 with respective screws.

The center cone 4 as a clamping member or a pushing member is supported rotatably substantially in the center of the first plate 11. The second plate 12 is attached to the leaf spring 8 at its base portion 12b, and is subjected to a pushing return force in an upward direction. A portion of the upper plate 3 is bent upwards. On this bent portion, at a position that allows the center cone 4 to remain at a large enough distance from the spindle 2 to permit unrestricted insertion of a jacket 10′ between the center cone 4 and the spindle 2, is disposed a stopping portion 3a as a restraining member to couple with a front end 11a of the first plate 11 from above and to bend the first plate 11 with respect to the second plate 2. Furthermore, the above-mentioned cam 6 is disposed so as to act on a suitable position (substantially in the center in the drawing) on the top of the second plate 12.

Other aspects of the above arrangement are the same as the conventional arrangement explained with reference to FIGS. 1A and 1B.

Figure 2A:
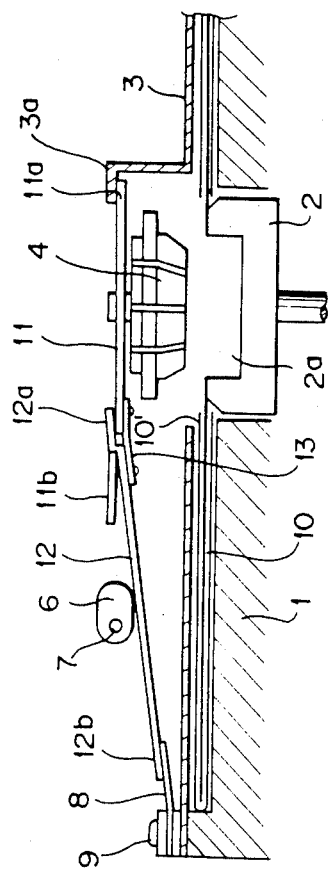
FIGS. 2A, 2B and 2C are side views showing a condition in which a recording medium is not clamped, a condition in which a recording medium is being clamped and a condition in which a recording medium is clamped, respectively, in an embodiment of a recording medium clamping apparatus according to the present invention.
Figure 2B:
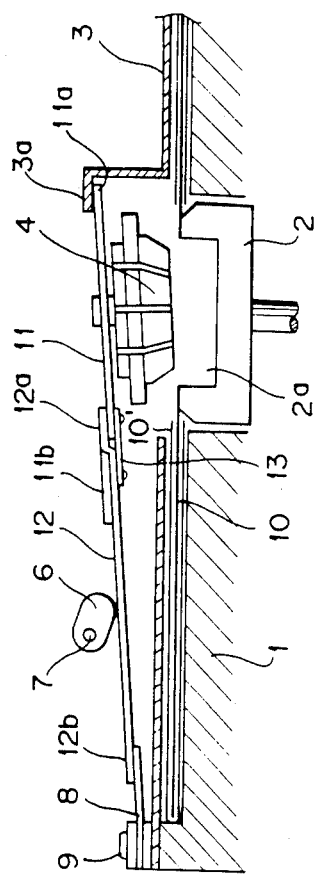
Figure 2C:
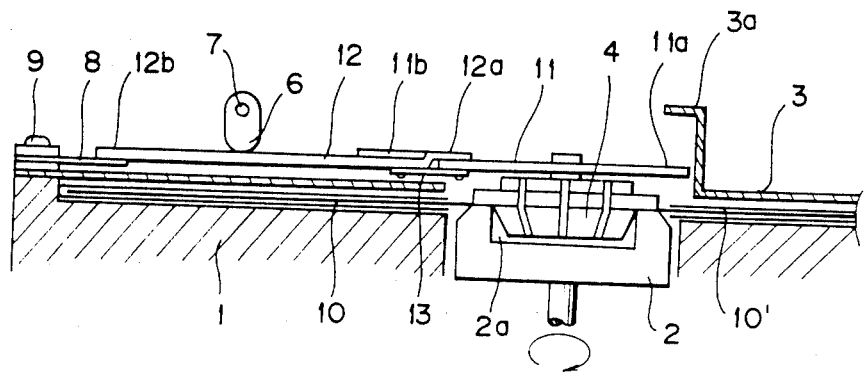

FIG. 2A shows an unclamped condition, FIG. 2B shows a condition during clamping and FIG. 2C shows a condition after completion of clamping.

In the unclamped condition of the above arrangement as shown in FIG. 2A, the second plate 12 is lifted upwards by the leaf spring 8 until it contacts the cam 6, that is, until it reaches the second position. Then, in this condition, the first plate 11 which was coupled by the hinge spring 13 at the same time is lifted upwards. The front end 11a of the first plate 11 is in contact with the stopping portion 3a formed on the upper plate 3. Because the highest position of the first plate 11 is restricted, the first plate 11 swings from the third position, and bending of the first plate 11 occurs on the second plate 12 at the position of the hinge spring 13. The height of the stopping portion 3a is set so that the first plate and the center cone 4 are substantially horizontal. In this situation, the first plate 11 is subjected to an upward force by the hinge spring 13.

Next, in the condition shown in FIG. 2A, the cam 6 is rotated in the direction of the arrow A by the operating lever (not shown), so that the second plate 12 is pushed downwards. At this time, the hinge spring 13 exerts an upward force on the first plate 11 until it reaches a straight condition, so that the front end 11a of the first plate 11 and the stopping portion 3a make contact until the first plate 11 is in a direct line with the second plate 12 (the condition shown in FIG. 2B).

Moreover, when the cam 6 rotates in the direction of the arrow A, the first and second plates 11 and 12 remain in a direct line, that is, the first plate 11 is kept in the third position with respect to the second plate 12, and they move together while drawing an arc. As a result of this, the center cone 4 enters into the center opening portion of the magnetic disc 10 and into the recess 2a on the spindle 2.

Then, when the cam 6 has rotated approximately 90 degrees, the second plate 12 reaches the first position, completing the clamping operation and producing the conditions shown in FIG. 2C.

Figure 1B:
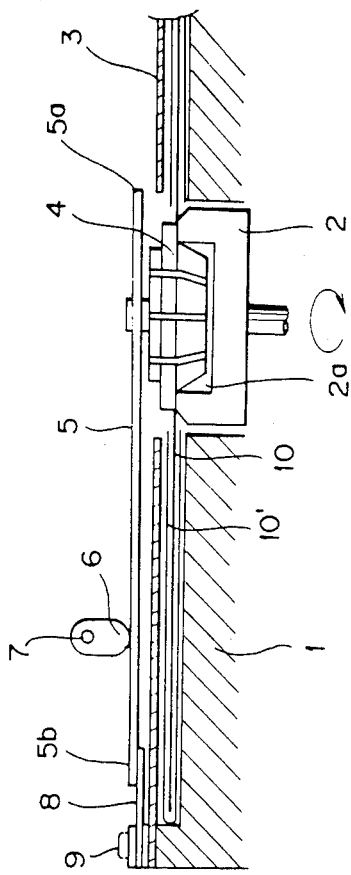

As can be understood by comparing these conditions to those with the conventional apparatus shown in FIGS. 1A and 1B, with an arrangement in which the clamp operation plate in a conventional apparatus is divided into a two-part structure, said parts being coupled by a hinge spring, and in which a simple stopping portion is disposed to restrict vertical movement, the present embodiment allows for a reduction in the operating space (particularly in the vertical direction) needed for a clamp operation means, thereby making a major contribution to a slim overall design for a recording and/or reproducing apparatus.

Next, an explanation will be made of an embodiment of a recording medium clamping apparatus in which further improvements are made to the embodiment of a recording medium clamping apparatus described above so as to make a major contribution to a slim design of a recording and/or reproducing apparatus, and at the same time to permit stable and accurate clamping of a recording medium.

FIGS. 4A-4C, 5, 6, 7A and 7B show a further embodiment of a recording medium clamping apparatus according to the present invention. In these drawings, the elements having the same reference numerals as in FIGS. 1A and 1B have substantially the same arrangement and the same effect, and so no explanation will be made of these elements to the extent that such omission does not hinder an understanding of the present invention.

A supporting member for the clamping means corresponding to the center cone support plate 5 in the conventional arrangement is divided in the present embodiment into a two-part structure having first and second plates 111 and 112. These plates 111 and 112 have step-shaped arm portions 111b and 112a at their respective rear and front end portions. As shown in detail in FIG. 5, these arm portions 111b and 112a are arranged alternately. These plates 111 and 112 are linked at this joint portion by a hinge spring 112′. The first plate 111 can bend downwards with respect to the second plate 112 at this joint portion. The hinge spring 112′ is formed into a leaf spring so that in a natural condition, the arm portion 111b of the first plate 111 and the arm portion 112a of the second plate 112 make contact with the upper surfaces of the second and first plates 112 and 111 respectively, and appear as a straight line when viewed from the side. That is, the first plate 111 is at a third position where it is restricted by the arm portion 111b and the arm portion 112a with respect to the second plate 112. Furthermore, the hinge spring 112′ is fixed to the first and second plates 111 and 112 with respective screws.

The first plate 111 has a ramped ear portion 111c for receiving pressing rollers, described below, on both sides of the plate 111. The sides of the ear portions 111c where the rollers enter are formed into ramp portions 111d to facilitate smooth entry of the rollers. The second plate 112 has a protrusion 112c in its central portion for receiving the pressing rollers described below. The side of the protrusion 112c where the roller enters on this plate is formed into a downward tapered portion 112d to facilitate smooth entry of the rollers.

With reference again to FIGS. 4A-4C, the center cone 4 as a clamping member or a pushing member is supported rotatably on a rotating shaft 4a in substantially the center of the first plate 111. The second plate 112 is attached to a leaf spring 8 at its base portion 112b, and is subjected to a return pushing force in an upward direction. A portion of the upper plate 3 is bend upwards. On this bent portion, at a position that allows the center cone 4 to remain at a large enough distance from the spindle 2 to permit unrestricted insertion of a jacket 10′ between the center cone 4 and the spindle 2, is disposed a stopping portion 3a as a restraining member to couple with a front end 111a of the first plate 111 from above and to bend the first plate 111 with respect to the second plate 112.

Reference numerals 114 and 113 denote respectively first and second pressing rollers that included a pressing mechanism as a pressing member against a supporting member or a supporting means that includes the abovementioned first and second plates 111 and 112. The second roller 113 presses the second plate 112 in a downward direction through the protrusion 112c. A pair of the first rollers 114 are disposed, and press the first plate 111 in a downward direction through the ear portions 111c on both sides of the plate 111. These rollers 113 and 114 cooperate to move the center cone 4 to clamp the magnetic disc 10 with the spindle 2.

Other aspects of the above arrangement are the same as those of the conventionai arrangement explained with reference to FIGS. 1A and 1B.

An explanation will now be made of the action of the above arrangement of the apparatus with reference to FIGS. 4A–4C.

Figure 4A:
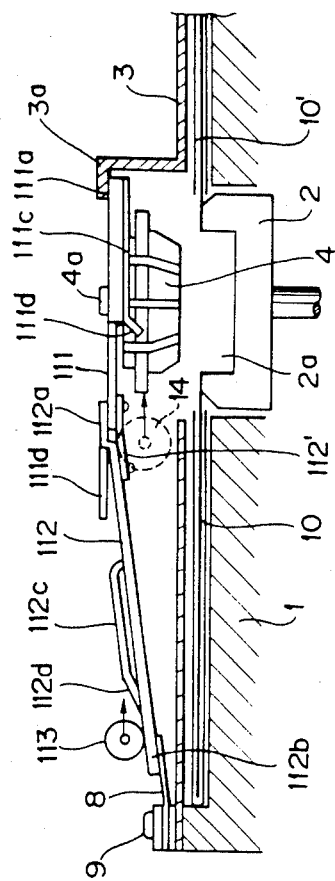
FIGS. 4A, 4B and 4C are side views showing a condition in which a recording medium is not clamped, a condition in which a recording medium is being clamped and a condition in which a recording medium is clamped, respectively, in another embodiment of a recording medium clamping apparatus according to the present invention.
Figure 4B:
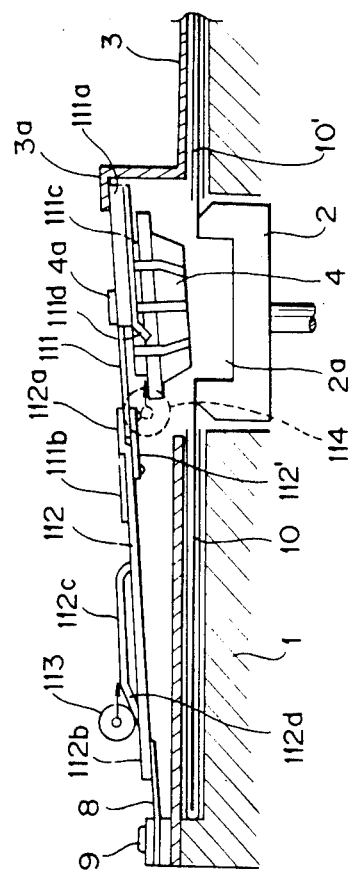
Figure 4C:
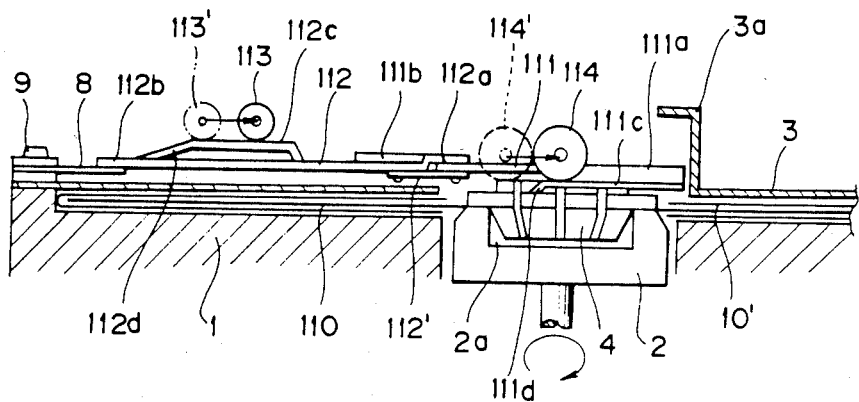
Figure 5:
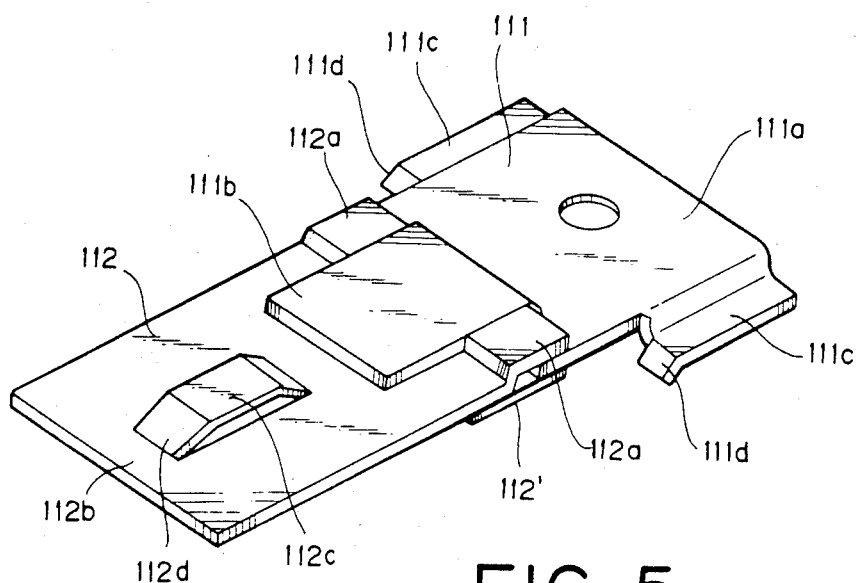
FIG. 5 is a perspective view showing a coupled condition of a first and a second plate in FIGS. 4A, 4B and 4C.

FIGS. 4A–4C show successive conditions in a clamping operation.

First, in the unclamped condition shown in FIG. 4A, the second plate 112 is lifted upwards and placed in the second position by the leaf spring 8. Then, at the same time in this condition, the first plate 111 that is linked by the hinge spring 112' is also lifted upwards. The front end 111a of the plate 111 makes contact with the stopping portion 3a formed on the upper plate 3. Because the highest position of the first plate 111 is restricted, the first plate 111 swings from the third position and bending of the first plate 111 is performed on the second plate 112 at the position of the hinge spring 113. The height of the stopping portion 3a is set so that the first plate 111 and the center cone 4 are substantially horizontal. In this situation, the hinge spring 112' exerts an upward force on the first plate 111.

In this condition, after the magnetic disc jacket 10' has been loaded, the pressing mechanism described below is operated, and the pressing rollers 113 and 114 move horizontally in the direction of the arrow in the drawing. In FIGS. 4A–4C, the distance between the rollers 113 and 114 is shorter than the distance between the protrusion 112c on the second plate 112 and the ear portion 111c on the first plate 111. Consequently, the first roller 113 reaches the tapered portion 112d on the roller entry side of the protrusion 112c on the second plate 112 before the first roller 114 reaches the ear portion 111c on the first plate 111. The second plate 112, therefore, are pressed downwards acting against the force of the leaf spring 8 by the second roller 113. At this time, the hinge spring 112' exerts a force in an upward direction on the first plate 111 until that plate is in a straight line. As a result, the front end 111a of the first plate 111 and the stopping portion 3a remain in contact (the condition shown in FIG. 4B) until the first plate 111 is in a direct line with the second plate 112.

Then, when the roller 113 moves until it mounts the protrusion 112c on the second plate 112 as shown by the reference numeral 113' in FIG. 4C, the first and second plates 111 and 112 move together remaining in a straight line, that is, the first plate 111 is kept in the third position with respect to the second plate 112, and move together drawing an arc. The center cone 4 enters into the center opening on the magnetic disc 10 and into the recess 2a on the spindle 2, and reaches the first position.

Furthermore, while the second roller 113 is being moved from the position denoted by reference numeral 113' in FIG. 4C to the position shown by the dotted and dash line, the first rollers 114 move from the position denoted by reference numeral 114' in the same drawing to the position shown by the dash and dotted line. At this time, the first rollers 114 mount on the ear portions 111c of the first plate 111 through the ramp portions 111d on the sides of the plate where the rollers enter. The required clamping force is thereby exerted on the center cone 4 through the first plate 111. In this manner, clamping of the magnetic disc 10 is completed, producing the conditions shown in FIG. 4C.

An explanation will be made of the pressing mechanism with reference to FIGS. 6, 7A and 7B. In these drawings, reference numeral 124 denotes a restraining frame fixed to the upper plate 3 with a screw 125 and having a restraining portion 124a to prevent the roller 113 from rising and a restraining portion 124b to prevent the roller 114 from rising. Reference numeral 115 denotes a sliding lever that engages at a long hole 115a with a pin 116 disposed protrudingly on the upper plate 3, allowing the sliding lever 115 to move up and down in the FIG. 6. An operating knob 117 is attached to a portion of the sliding lever 115. An arm which extends to the left in FIG. 6 on the sliding lever 115 is bent as shown in FIG. 7A and formed into a supporting frame portion 115b for the second roller 113. The roller shaft 118 is mounted so as to intersect across the frame portion 115b. The second roller 113 is mounted rotatably to the roller shaft 118 between the downward bent portions 115c disposed on the frame portion 115b, and partially protrudes from an opening 115e. Furthermore, the roller shaft 118 has a pair of lifting prevention rollers 119 mounted rotatably so as to put the second roller 113 therebetween.

One of the rollers 119 is disposed on the outer side of the frame portion 115b. The other is disposed between the pair of downward bent portions 115d disposed on the frame portion 115b, and protrudes partially through the opening 115f. These rollers make contact with the lower surface of the restraining portion 124a of the restraining frame 124 fixed to the upper plate 3 with screws 125. This contact restrains the frame portion 115b from rising due to the spring force of the leaf spring 8 that acts through the second plate 112 and the second roller 113.

Reference numeral 120 denotes a supporting frame for supporting the first rollers 114. The rear fork portion 120a of the frame 120 engages with the roller shaft 118 and is attached rotatably to the roller shaft 118. The first rollers 114 and rising prevention rollers 123 are attached rotatably to roller shafts 122 disposed on the front fork portion 120b of the frame 120. The rollers 123 are separated from the rollers 114 and are in contact with the lower surface of the restraining portion 124b of the restraining frame 124 which is fixed to the upper plate 3 with screw 125, so that the frame 120 is restrained from rising. The frame 120 is subjected to an upwardly rotational force against the frame portion 115b by a coil spring 121 wound on the roller shaft 118.

In the present embodiment, the second roller 113 and its rising prevention rollers 119, and the second rollers 114 and its rising prevention rollers 123 are separate members. This is because when clamped and when the clamp is released, the pressing rollers (113 and 114) and the rising prevention rollers (119 and 123) rotate in opposite directions to each other. Therefore, operation is smoother if the pressing rollers and the rising prevention rollers are separate members instead of being arranged as a single member.

Figure 6:
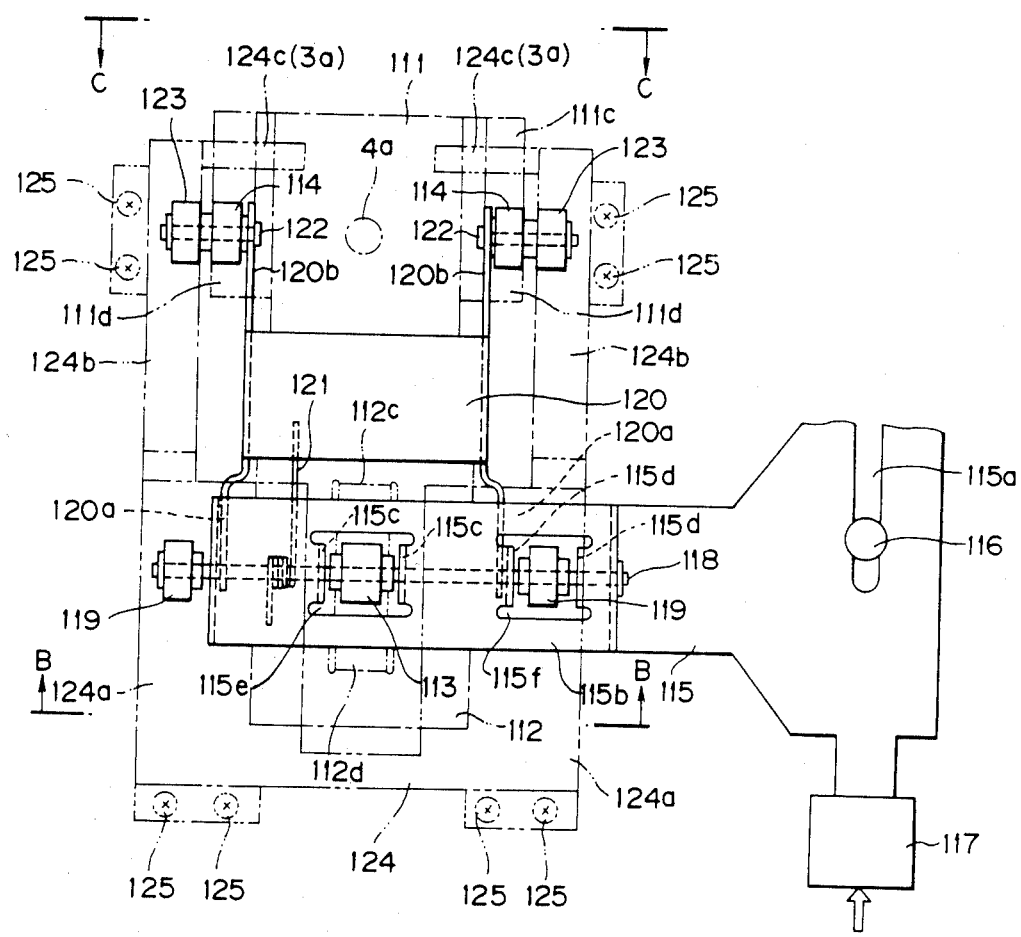
FIG. 6 is a plan view showing an embodiment of a pressing mechanism for performing a clamping action in the recording medium clamping apparatus shown in FIGS. 4A–4C.
Figure 7A:
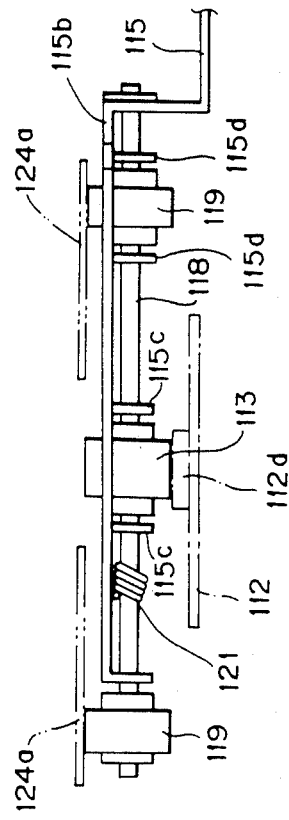
FIGS. 7A and 7B are cross-sectional views taken along the B—B and C—C axes, respectively, of the pressing mechanism shown in FIG. 6.
Figure 7B:
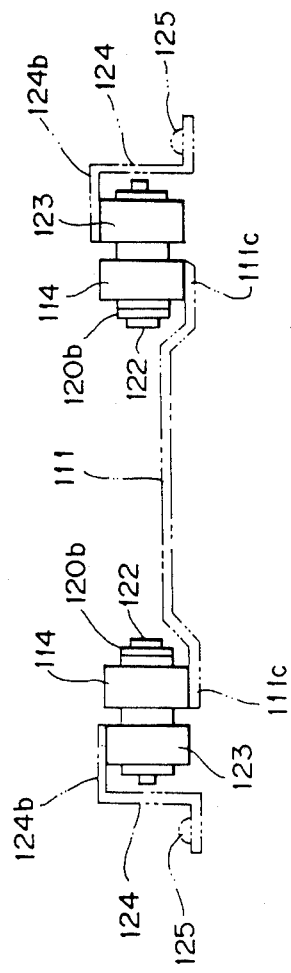

FIGS. 6, 7A and 7B show the above arrangement in the condition in which clamping is completed (refer to FIG. 4C). That is, when the operating knob 117 for performing clamping is turned in the direction of the arrow, the sliding lever 115 slides upwards in FIG. 6. At this time, the second roller 113 first mounts the protrusion 112c on the second plate 112 through the tapered portion 112d. In this situation, the force of the leaf spring 8 acting on the second plate 112 exerts an upward force on the second roller 113. On the other hand, the roller 119 contacts the lower surface of the restraining portion 124a of the restraining frame 124 so that it presses down on the second plate 112 in the opposite direction against the leaf spring 8 (the condition shown in FIG. 4B). Then, when the second roller 113 mounts completely on the protrusion 112c on the second plate 112, the arrangement adopts the conditions shown in the above-mentioned FIG. 4C. At this time, the positions of the rollers 113 and 114 are denoted by reference numerals 113' and 114' respectively in FIG. 4C. When the operating knob 117 is pushed in further in this condition, the second roller 113 moves on top of the protrusion 112c on the second plate 112, and the first rollers 114 mount on the ear portion 11c of the first plate 111 through the ramped portion 111d, prevented from rising by contact between the roller 123 and the lower surface of the restraining portion 124b of the restraining frame 124.

When the rollers 114 reach positions corresponding substantially to both sides of the rotating shaft 4a of the center cone 4, the sliding lever 115 is latched, for example, by means for latching (not shown). This secures the conditions shown in FIG. 4C (at this time, the positions of the rollers 113 and 114 are shown by the dotted and dash lines in FIG. 4C).

As can be understood by comparing these conditions with the conventional arrangement shown in FIGS. 1A and 1B, the present embodiment reduces the operating space (particularly in the vertical direction) needed by the supporting plate and thereby make a major contribution to a slim overall design of a recording and/or reproducing apparatus by adopting an extremely simple arrangement in which the center cone supporting plate 5 in the conventional arrangement is divided into a two-part structure (plates 111 and 112), both parts being linked by a hinge spring 112', and in which a stopping portion is disposed to restrain rising. Furthermore, the downward pressure of the center cone 4 is applied by the rollers close to the center cone so that a stable and accurate clamping force is obtained.

It is also possible to perform the clamping action only by a downward pressure of the first plate 111 applied by the first rollers, and not by the two-step downward pressure of the second and first rollers 113 and 114 as in the present embodiment. In this case, it is desirable to fix the frame 120 to one portion of the sliding lever 115. Of course, the first roller 113 and its related members will then be unnecessary.

Furthermore, in the present embodiment the final position of the second rollers 114 corresponds substantially to both sides of the rotating shaft 4a of the center cone 4. The position of the downward pressure of the roller 114 need not be limited like this, however, provided that the position is close to the center cone supporting member in order to provide a stable and accurate clamping force.

Furthermore, instead of the portion of the upper plate 3 used as the stopping member 3a to restrain the first plate 111 in the unclamped condition shown in FIG. 4A, it is possible to use a portion of the restraining frame 124 extending above the first plate 111 as shown by the reference numeral 124c in FIG. 6 as the stopping member.

Moreover, in the above embodiments, a single bendable portion is disposed on a clamp operating member, but a plurality of bendable portions can be disposed when necessary.

Furthermore, instead of disposing a hinge spring at the link portion between the first plate (11 and 111) and the second plate (12 and 112), it is also receiveable to dispose, for example, a tension spring that pulls the first plate from above.

Furthermore, instead of using separate first and second plates, it is also possible to use, for example, a single member as shown by reference numeral 5 in FIGS. 1A and 1B, such a member being formed from a flexible material so that when it engages with the stopping member 3a it will bend.

The above embodiments have described the present invention in application to a magnetic disc recording and/or reproducing apparatus, but the present invention is also applicable to other apparatuses, for example a laser disc recording and/or reproducing apparatus.

As described above, by adopting a simple arrangement, the present invention allows for a reduction in the operating space occupied by a clamp operating member, thereby allowing for a slim overall design of a recording and/or reproducing apparatus. Furthermore, the arrangement according to the present invention also guarantees a stable and accurate clamping force by the clamping means, and is extremely advantageous in a recording and/or reproducing apparatus.

What is claimed is:

1. A recording medium clamping apparatus, comprising:
   a spindle, rotatable to rotate a disc-shaped recording medium thereon;
   a clamping member cooperatable with said spindle to clamp the recording medium at a center portion of the recording medium;
   a clamp operating member having a first end and a second end opposite said first end, rotatably supporting said clamping member at said first end, said clamp operating member being bendable at a bending portion of said clamp operating member spaced from and located between said first and second ends, in a direction toward said spindle;
   a supporting member pivotably supporting said clamp operating member at said second end, for pivotal movement between a first position of said clamp operating member in which said clamping member clamps the recording member and a second position of said clamp operating member in which said clamping member is released from clamping of the recording member, said clamp operating member, when between said first and second positions, being pivotable at said supporting member so as to pivot both said bending portion and said first end together about said supporting member either toward or away from said spindle; and
   a restraining member disposed so as to engage a portion of said clamp operating member and bend said lamp operating member at said bending portion toward said spindle, when said clamp operating member is in said second position.

2. An apparatus as in claim 1, wherein said clamp operating member includes a first plate rotatably supporting said clamping member; a second plate pivotable between said first and second positions, and pivotably supporting said first plate at said bending portion such that said first plate is pivotable toward and away from said spindle; and an energizing member having means for urging said first plate pivotally away from said spindle.

3. An apparatus as in claim 2, wherein said elastic energizing member is mounted on said clamp operating member.

4. An apparatus as in claim 2, wherein said energizing member comprises an elastic member mounted to said first plate and to said second plate at said being portion.

5. A recording medium clamping apparatus as claimed in claim 2, wherein said energizing member has a spring disposed at a joint portion between said first and said second plates, said joint portion being located at said bending portion.

6. A recording medium clamping apparatus as claimed in claim 2, further comprising a base, wherein said supporting member has a leaf spring mounted on said base, and said second plate is pivotally supported by said leaf spring.

7. A recording medium clamping apparatus, comprising:
 a spindle, rotatable to rotate a disc-shaped recording medium thereon;
 a clamping member cooperatable with said spindle to clamp the recording medium at a center portion;
 a clamp operating member having a first end and a second end opposite said first end, rotatably supporting said clamping member at said first end, said clamp operating member being bendable at a bending portion of said clamp operating member spaced from and located between said first and second ends, in a direction toward said spindle;
 a supporting member pivotably supporting said clamp operating member at said second end, for pivotal movement between a first position of said clamp operating member in which said clamping member clamps the recording member and a second position of said clamp operating member in which said clamping member is released from clamping of the recording member; said clamp operating member, when between said first and second positions, being pivotable at said supporting member so as to pivot both said bending portion and first end together about said supporting member either toward or away from said spindle;
 a restraining member disposed so as to engage a portion of said clamp operating member and bend said clamp operating member at said bending portion toward said spindle, when said clamp operating member is in said second position; and
 means, including a pressing member engageable with said operating member at a pressing portion in the vicinity of said first end, for pressing said clamp operating member toward said spindle in said vicinity of said first end, so as to clamp said recording medium to said spindle with said clamping member, when said clamp operating member is moved from said second position to said first position.

8. A recording medium clamping apparatus as claimed in claim 7, further comprising a command member for moving said clamp operating member toward said first position, and said pressing member is movable toward a portion which is in the vicinity of said portion to which said clamping member is attached in relation to an operation of said command member to press said clamping operating member.

9. An apparatus as in claim 7, further comprising command member means, operable to move said clamp operating member toward said first position, said pressing member being movable in response to the operation of said command member means, to said pressing position to press said clamping operating member so as to clamp said recording medium to said spindle with said clamping member.

10. A apparatus as in claim 9, wherein said clamp operating member includes a first plate rotatably supporting said clamping member, a second plate pivotable between respective portions thereof when said clamp operating member is in said first and second positions, and pivotably supporting said first plate at said bending portion such that said first plate is pivotable toward and away from said spindle, and an energizing member having means for urging said first plate pivotally away from said spindle.

11. An apparatus as in claim 10, wherein said elastic energizing member is mounted on said clamp operating member.

12. An apparatus as in claim 10, wherein said energizing member comprises an elastic member mounted to said first plate and to said second plate at said bending portion so as to bias said first plate pivotally away from said spindle.

13. An apparatus as in claim 10, wherein said first plate includes a receiving member at said pressing portion, said pressing member including a first roller member rideable over said receiving member to press said first plate toward said spindle.

14. A recording medium clamping apparatus as claimed in claim 13, wherein said command member has a second roller member which moves simultaneously with said first roller member in a same direction to move said second plate towards the position thereof when said clamp operating member is in said first position, said second plate has a protruding member over which said second roller member rides to move said second plate toward the position thereof when said clamp operating member is in said first position, and said command member further has a coupling member which is coupled to said first and said second roller members and which is movable in said same direction to guide said first and said second roller members over said receiving member and said protruding member, respectively.

15. A recording medium clamping apparatus as claimed in claim 14, wherein said first and said second roller members are separated by a first separation distance along said same direction which is smaller than a second separation distance along said same direction between a position at which said first roller member rides over said receiving member and a position at which said second roller member rides over said protruding member such that during the movement of said coupling member in said same direction, after said second plate has reached the position thereof when said clamp operating member is in said first position in response to riding of said second roller member over said protruding member, said first roller member rides over said receiving member to press said first plate toward said spindle.

16. A recording medium clamping apparatus comprising:
 a base;

a driving member means, having a rotary shaft, for rotating a disc-shaped recording medium thereon;

a pushing member having means for releasably pushing the recording medium against said rotary shaft; and a supporting means for supporting said pushing member and moving said pushing member between respective portions engaging and remote from the recording medium, said supporting means having a first supporting member having a first end and a second end opposite said first end, rotatably supporting said pushing member at a said first end, and a second supporting member pivotably supported on said base and pivotably supporting and carrying said first supporting member at a connection therebetween at said second end; and a control member having means for preventing relative pivotal movement between said first and second supporting members in a direction away from which said pushing member pushes the recording medium against said rotary shaft, when said pushing member pushes the recording medium against said rotary shaft, and for making said first supporting member pivotable at said connection when said pushing member is remote from said rotary shaft.

17. A recording medium clamping apparatus as in claim 16, wherein said pushing member is movable to a location adjacent said rotary shaft to push the recording medium against said rotary shaft, said second supporting member is pivotable between a first position at which said recording member is pushed against said rotary shaft by said first supporting member and said pushing member and a second position spaced from said first position, at which said pushing member is made remote from said location adjacent said shaft to release said pushing member from the recording medium.

18. A recording medium clamping apparatus as in claim 17, further comprising a restraining member having means for engaging said first supporting member when said second supporting member is in the vicinity of said second position to pivot said first supporting member relative to said second supporting member in a direction toward said rotary shaft while said first supporting member is pivoting in a direction from said first position toward said second position.

19. A recording medium clamping apparatus comprising:

a base;

a spindle, rotatable to rotate a recording medium thereon;

a clamping member having means for clamping said recording medium to said spindle;

a clamp operating member having first and second members pivotally joined to each other, said first member having a free end and supporting said clamping member at said free end, said second member being pivotally supported on said base;

a control mechanism having means for moving said clamp operating member between a first position and a second position, said clamping member being pressed against said spindle to clamp said recording medium to said spindle when said clamp operating member is in said first position, said clamping member being separated from said spindle when said clamp operating member is in said second position; and a restricting member having means for restricting the pivoting direction of said first member, said restricting means comprising means for preventing said first member from pivoting relative to said second member toward a position adopted by said first member when said clamp operating member is positioned at said second position, when said clamp operating member is positioned at said first position by said control mechanism, said restricting means permitting said first member to pivot relative to said second member toward a position adopted by said first member when said clamp operating member is positioned at said first position, when said clamp operating member is positioned at said second position by said control mechanism.

* * * * *